US012589435B2

(12) United States Patent
Buermeyer et al.

(10) Patent No.: US 12,589,435 B2
(45) Date of Patent: Mar. 31, 2026

(54) POWDER DISPENSING SYSTEM FOR ADDITIVE MANUFACTURING

(71) Applicant: VulcanForms Inc., Devens, MA (US)

(72) Inventors: Lucas Buermeyer, Ayer, MA (US); William Curtis Stone, Medford, MA (US)

(73) Assignee: VulcanForms Inc., Devens, MA (US)

( * ) Notice: Subject to any disclaimer, the term of this patent is extended or adjusted under 35 U.S.C. 154(b) by 24 days.

(21) Appl. No.: 18/746,627

(22) Filed: Jun. 18, 2024

(65) Prior Publication Data

US 2024/0424569 A1 Dec. 26, 2024

Related U.S. Application Data

(60) Provisional application No. 63/510,213, filed on Jun. 26, 2023.

(51) Int. Cl.
| | |
|---|---|
| *B29C 64/329* | (2017.01) |
| *B22F 12/52* | (2021.01) |
| *B22F 12/57* | (2021.01) |
| *B22F 12/67* | (2021.01) |
| *B33Y 30/00* | (2015.01) |

(52) U.S. Cl.
CPC .............. *B22F 12/52* (2021.01); *B22F 12/57* (2021.01); *B22F 12/67* (2021.01); *B33Y 30/00* (2014.12)

(58) Field of Classification Search
None
See application file for complete search history.

(56) References Cited

U.S. PATENT DOCUMENTS

| | | | |
|---|---|---|---|
| 9,956,612 | B1 | 5/2018 | Redding et al. |
| 10,022,795 | B1 | 7/2018 | Redding et al. |
| 2014/0000332 | A1 | 1/2014 | Wilson et al. |
| 2016/0158889 | A1 | 6/2016 | Carter et al. |
| 2016/0368050 | A1 | 12/2016 | Morris et al. |

(Continued)

FOREIGN PATENT DOCUMENTS

| | | | | |
|---|---|---|---|---|
| CN | 105598451 | A | * 5/2016 | .............. B22F 12/63 |
| CN | 106422827 | A | * 2/2017 | ............... B22F 1/16 |

(Continued)

OTHER PUBLICATIONS

International Search Report and Written Opinion mailed Mar. 25, 2024 in connection with International Application No. PCT/US2023/081722.

*Primary Examiner* — Yung-Sheng M Tsui
(74) *Attorney, Agent, or Firm* — Wolf, Greenfield & Sacks, P.C.

(57) ABSTRACT

System and method for dispensing powder material for an additive manufacturing system. A hopper can include a spline configured for rotation to dispense powder material from an exit opening of the hopper. A shield can be provided for one or both ends of the spline to help control powder movement at an interface with the spline, e.g., so powder that passes the interface is trapped in a space. An auger can be provided in a hopper and configured for moving powder in the hopper in two opposed directions in response to rotation of the auger in a single direction. A common drive can be used to move both an auger and spline. One or more load cells can be provided to determine a mass of powder delivered to and/or dispensed from the hopper.

38 Claims, 16 Drawing Sheets

(56)         References Cited

U.S. PATENT DOCUMENTS

| | | | |
|---|---|---|---|
| 2017/0021455 A1 | 1/2017 | Dallarosa et al. | |
| 2017/0056975 A1 | 3/2017 | Carter et al. | |
| 2018/0200792 A1 | 7/2018 | Redding et al. | |
| 2018/0207722 A1 | 7/2018 | Feldmann et al. | |
| 2018/0236549 A1 | 8/2018 | Spears et al. | |
| 2019/0118263 A1 | 4/2019 | Buller et al. | |
| 2019/0143406 A1 | 5/2019 | Carter et al. | |
| 2019/0299286 A1 | 10/2019 | Feldmann et al. | |
| 2020/0039000 A1 | 2/2020 | Sweetland | |
| 2020/0079012 A1 | 3/2020 | Pawliczek et al. | |
| 2020/0108465 A1 | 4/2020 | Sweetland | |
| 2020/0230745 A1 | 7/2020 | Komsta et al. | |
| 2020/0376761 A1 | 12/2020 | Sweetland | |
| 2021/0339318 A1 | 11/2021 | Dunbar et al. | |
| 2022/0009030 A1 | 1/2022 | Dadelszen et al. | |
| 2023/0056367 A1 | 2/2023 | Leonardo et al. | |

FOREIGN PATENT DOCUMENTS

| | | | | | |
|---|---|---|---|---|---|
| CN | 107855526 A | * | 3/2018 | .............. | B22F 12/52 |
| EP | 3 521 028 A1 | | 8/2019 | | |
| WO | WO 2022/086331 A1 | | 4/2022 | | |

* cited by examiner

POWDER DISPENSING SYSTEM FOR ADDITIVE MANUFACTURING

RELATED APPLICATIONS

This application claims priority under 35 U.S.C. § 119(e) to U.S. Provisional Application No. 63/510,213, filed Jun. 26, 2023, the content of which is incorporated by reference in its entirety for all purposes.

FIELD

Disclosed embodiments are generally related to powder dispensing systems, e.g., for a recoater assembly used in additive manufacturing systems.

BACKGROUND

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited and areas selective fused. For example, in conventional systems, the build surface may be indexed downwardly by a distance corresponding to a thickness of a layer. This process may be repeated layer-by-layer to fuse many two-dimensional layers into a three-dimensional object.

SUMMARY

In some embodiments, a recoater assembly for depositing a powder material for an additive manufacturing system includes a hopper body configured to hold the powder material, and a rotating element configured to rotate relative to the hopper body and dispense the powder material from the hopper body. For example, the rotating element may include a spline having one or more cavities, e.g., that extend along a longitudinal axis of the spline. The spline may be configured to hold powder material on the outer surface and to rotate relative to the hopper body to carry the powder material to and through an exit opening to dispense the powder material from the hopper body. For example, part of the spline may be located in the hopper body to contact and pick up powder material, and another part of the spline may be located outside of the hopper such that powder material on the outer surface of the spline can be dropped or otherwise deposited from the hopper body. Such movement and deposition of powder material may be performed in response to rotation of the spline. However, upon stopping of rotation of the spline, no powder material may be dispensed from the exit opening of the hopper body.

In some embodiments, the hopper body has an exit opening in which the spline is positioned. The exit opening may have a lower end and an upper end, and the spline may be positioned at least partially in the exit opening. The spline may be configured to rotate so that portions of the spline within the hopper body move upwardly and toward the upper end of the exit opening of the hopper body. Thus, the spline may be configured to carry powder material in the hopper body upwardly and out of the hopper body, e.g., powder material may be carried upwardly to and through an exit opening such that powder material is carried by the spline past a highest point of the spline. Once the powder material carried by the spline passes the highest point of the spline and is in the exit opening, the powder material may fall from or otherwise be removed from the spline for deposition on a build surface or other location. In some cases, the spline has an elongated shape with a longitudinal axis and is configured to rotate about the longitudinal axis of the spline. The longitudinal axis may extend along the exit opening, e.g., be positioned near a vertical center of the exit opening.

In some cases, the recoater assembly includes a metering blade positioned over a portion of the spline and configured to define a gap between the metering blade and the spline to limit an amount of powder material that passes through the gap in response to rotation of the spline. In some cases, the metering blade may define a thickness of powder material that is carried by the spline to the exit opening of the hopper body. In some examples, the spline may have an uppermost portion and the metering blade may be positioned so the gap is located below the uppermost portion of the spline, but above a center or rotation axis of the spline. This arrangement may help prevent powder material from exiting through the exit opening when the spline does not rotate. In some examples, the gap may have a size of from 200 μm to 2 mm. The metering blade may have a surface that faces the spline and diverges away from the spline in a direction from a leading edge of the metering blade toward a trailing edge of the metering blade. This may help prevent the metering blade from compacting or otherwise pressing powder material onto the surface of the spline.

In some embodiments, a bottom interface that extends around at least part of a lowermost portion of the spline. The bottom interface may define an arrangement together with the spline to help resist exit of powder material from any gap between the bottom interface and the spline, whether or not the spline is rotated. In some cases, a leading end of the bottom interface may be positioned above the lowermost portion of the spline. For example, a portion of the bottom interface that is positioned at the exit opening may be vertically above the lowermost portion of the spline. This may provide a barrier to powder exit, which must move upwardly and over the leading end of the bottom interface to exit through the exit opening of the hopper body. In some cases, wherein a narrowest spacing between the bottom interface and the spline may be from 1 mm to 4 mm, although other sizes are possible.

In some embodiments, the spline may have one or more cavities that each have a concave shape in a cross-section perpendicular to a longitudinal axis of the spline. For example, the cavities may have a semi-circular or other suitable shape. In some examples, the one or more cavities may extend along a direction parallel to a longitudinal axis of the spline. The cavities may be configured to carry powder material from inside the hopper body to outside the hopper body, e.g., as the spline rotates.

In some embodiments, a recoater assembly for depositing a powder material for an additive manufacturing system includes a hopper body configured to hold powder material and an auger configured to move powder material in the hopper body in two opposed directions in response to movement of the auger in a single direction. In some cases, the auger may have a longitudinal axis and the two opposed directions may be along the longitudinal axis. In some examples, the auger may be configured to move powder material in the two opposed directions in response to rotation of the auger about the longitudinal axis. For example, when viewing the auger in a direction perpendicular to the longitudinal axis, the auger may be rotated in one direction (e.g., a clockwise direction) and the auger may move powder material in both left and right directions along the longitudinal axis.

In some embodiments, the auger may include a double helix mixer configured to distribute the powder material in opposing directions along a longitudinal axis of the auger for a single direction of rotation of the auger. For example, the auger may include first and second flights configured to move the powder material in the opposed directions in response to rotation of the auger. In some cases, the first and second flights may be ribbon flights. The first flight may be configured to move the powder material in a first one of the two opposed directions and the second flight may be configured to move the powder material in a second one of the two opposed directions. In some embodiments, the second flight may be nested within the first flight.

In some examples, the hopper body may be elongated and have first and second ends. A powder inlet may be located at a first end of the hopper body, and the auger may be configured to move powder material from the first end of the hopper body toward the second end, and may be configured to move powder material from the second end toward the first end. Such movement may help evenly distribute powder material within the hopper body. In some cases, the hopper body includes an exit opening through which powder material is dispensed from the hopper body, and the exit opening may extend from the first end to the second end. The recoater assembly may include a spline configured to dispense powder material from the hopper body, e.g., through the exit opening, in response to rotation of the spline relative to the hopper body. In some cases, the auger may be configured to rotate about an axis that is parallel to an axis about which the spline is configured to rotate, and may be arranged to evenly distribute powder material over the spline. This may help improve or otherwise provide uniform dispensing of powder along the exit opening.

In some embodiments, a recoater assembly for depositing a powder material for an additive manufacturing system includes a hopper body having an inner volume configured to hold powder material, and a spline having opposed longitudinal ends and configured to dispense powder material from the inner volume, e.g., in response to rotation of the spline. In some cases, a shield may be provided on a longitudinal end of the spline, and the shield may be configured such that powder material passing through an interface between the shield and the spline collects in a space defined at least in part by the spline and the shield. Powder material may be trapped in the space, and thereby prevented from reentering the hopper body inner volume for dispensing by the recoater assembly or otherwise being released from the recoater assembly. This may help prevent dispensing of potentially contaminated powder material, e.g., because the shield may be positioned to divide the inner volume of the hopper body from an outer casing or other portions outside of the inner volume which may not be made of or include materials suitable for contact with powder material used for part manufacturing.

In some embodiments, a radius of the spline where the interface is located is smaller than a radius of the spline in the inner volume. Thus, a portion of the spline used to dispense powder material from the hopper body may have a larger radius than a portion of the spline that defines the interface with the shield. This may help reduce a size of the interface, and so reduce an amount of powder material that passes through the interface. In some cases, the longitudinal end of the spline may be stepped so as to have a first portion in the inner volume that has a first radius, a third portion at the interface having a third radius, and a second portion between the first and third portions having a second radius. The first radius may be larger than the second and third radii, and the second radius may be larger than the third radius. In some embodiments, the shield includes first and second portions, with the first portion defining the interface with the spline and having a first outer diameter and the second portion being positioned outboard of the first portion and having a second outer diameter that is larger than the first outer diameter. In some cases, the first outer diameter may be smaller than a diameter of a portion of the spline in the inner volume, e.g., the first outer diameter may be close in size to the second portion of the spline. In some examples, the second portion of the shield may have a second inner diameter that is larger than a first inner diameter of the first portion of the shield that defines the interface with the spline. Thus, powder material passing through the interface between the first portion of the shield and the spline may fall downwardly into the space defined at least in part by the second inner diameter of the second portion of the shield. In some cases, a seal may be provided on the longitudinal end of the spline and outboard of the shield, e.g., in engagement with the third portion of the spline. The seal, the shield and the spline may cooperate to define the space, e.g., where powder material may be collected. The seal may be configured to prevent movement of powder material beyond the seal. In some embodiments, a portion of the shield extends outwardly from the inner volume, e.g., the first portion of the shield may extend from an area within the inner volume to outside of the inner volume, e.g., to an outer casing of the hopper body. The second portion of the shield may be positioned entirely outside of the inner volume. A shield may be provided on one or both longitudinal ends of the spline.

In some embodiments, a hook portion of the hopper body may extend around a part of the second portion of the spline. Thus, the hook portion may be located in the inner volume of the hopper body and extend around part of the spline outboard of the first portion, which may be used to dispense powder material from the hopper body. In some cases, the hook portion may engage with a portion of the shield adjacent the second portion of the spline. For example, the hook portion may engage with part of the first outer diameter of the first portion of the shield. In some examples, the portion of the shield engaged by the hook portion has an outer diameter that is approximately equal to the second diameter. Engagement of the hook portion and the first portion of the shield may provide a seal that prevents passage of powder material.

In some embodiments, a block may be provided in the inner volume and be disposed over a portion of the spline, e.g., a part of the first portion of the spline. Thus, a radius of the spline where the interface is located may be smaller than a radius of the spline where the block is located. In some cases, a portion of the spline in the inner volume of the hopper body may include cavities in an outer surface of the spline and the cavities may terminate in an area under the block. Since the block may be positioned relatively closely to, and at least partially conform to the shape of, the spline at the ends of the first portion of the spline, termination of the cavities under the block may help resist movement of powder material along the spline to the longitudinal ends of the spline. In some cases, at least a portion of the block may be disposed on a portion of the hopper body and may define an inner wall that defines the inner volume. For example, the block may be mounted at least in part to the hook portion. In some cases, a bottom interface may extend around a lowermost portion of the spline, e.g., at the first portion, and the bottom interface may abut the block and/or the hook portion.

In some embodiments, a recoater assembly for depositing a powder material for an additive manufacturing system includes a hopper body configured to hold a powder material, an auger configured to move powder material in the hopper body, a spline configured to dispense the powder material from the hopper body, and a drive system configured to move both the auger and the spline. Providing a single drive system for both the auger and the spline may provide a more simplified and compact recoater assembly. In some cases, the drive system may be configured to rotate the auger in two rotational directions, and may be configured to rotate the spline in only one rotational direction. In some examples, the drive system may include a single drive motor to move the auger and the spline, which may both be directly coupled to the single drive motor. In some cases, the spline may be coupled to the single drive motor by a one-way clutch, e.g., so that for rotational movement of the drive motor in one direction the spline may be rotated, but for rotational movement of the drive motor in the opposite direction the spline will not rotate. This arrangement may allow the drive system to simultaneously move both the auger and the spline, or to move only the auger but not the spline. Simultaneous movement of the auger and spline may be employed when dispensing powder material from the hopper body. Rotation of the auger only may be employed when filling the hopper body with powder material so the powder material can be spread in the hopper body but not dispensed.

In some embodiments, a recoater assembly for depositing a powder material for an additive manufacturing system includes a powder hopper from which the powder material is dispensable, and one or more load cells coupled to the powder hopper to detect a weight of the powder material held by the powder hopper. The load cells may employ any suitable type of sensor(s) to sense a characteristic of the weight of the powder hopper and/or powder material in the powder hopper in any suitable way. In some cases, a controller may be configured to control a powder dispensing system based on information from the one or more load cells regarding a weight of powder material held by the powder hopper. For example, load cells may be used to measure a weight of the powder hopper and based on a change in weight of the powder hopper, may determine a rate at which powder material is dispensed from the powder hopper. In some cases, the controller may be configured to control the powder dispensing system to dispense powder material at a variable rate based on the information from the one or more load cells. For example, the powder dispensing system may include a spline configured to rotate relative to the powder hopper to dispense the powder material, and the controller may be configured to vary a rate at which the spline is rotated to adjust the variable rate at which the powder material is dispensed based on information from the load cell(s). In some embodiments, a controller may be configured to calculate a number of layers dispensable by the powder hopper based at least in part on a weight of powder material held by the powder hopper.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

It should be understood that aspects of the invention are described herein with reference to the figures, which show illustrative embodiments. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

With the advancement of additive manufacturing systems, increased demands have been placed on every part of the system. Additive manufacturing systems have gotten faster, larger, and more intricate, and there exists an increasing need to maintain precision, quality, and efficiency without sacrificing other aspects of the system. One of the components in need of improvement is the powder hopper, which deposits powder material on a build surface of the additive manufacturing system. For example, some system use a blade and/or roller to push powder material across the build surface and can be vulnerable to blade and/or roller mis-alignment, therefore leading to uneven distribution of powder material across the build surface. In some systems, powder material may be released from a gate, which may not be able to precisely control a rate of powder material deposition and/or an amount of powder material deposited. The inventors have recognized these problems and a need for a hopper of an additive manufacturing system adapted to deal with the new demands of the advancing technology.

It will be appreciated that any embodiments of the systems, components, methods, and/or programs disclosed herein, or any portion(s) thereof, may be used to form any part suitable for production using additive manufacturing. For example, a method for additively manufacturing one or more parts may, in addition to any other method steps disclosed herein, include the steps of selectively fusing one or more portions of a plurality of layers of precursor material deposited onto the build surface to form the one or more parts. This may be performed in a sequential manner where each layer of precursor material is deposited on the build surface and selected portions of the upper most layer of precursor material is fused to form the individual layers of the one or more parts. This process may be continued until the one or more parts are fully formed.

Figure 1:
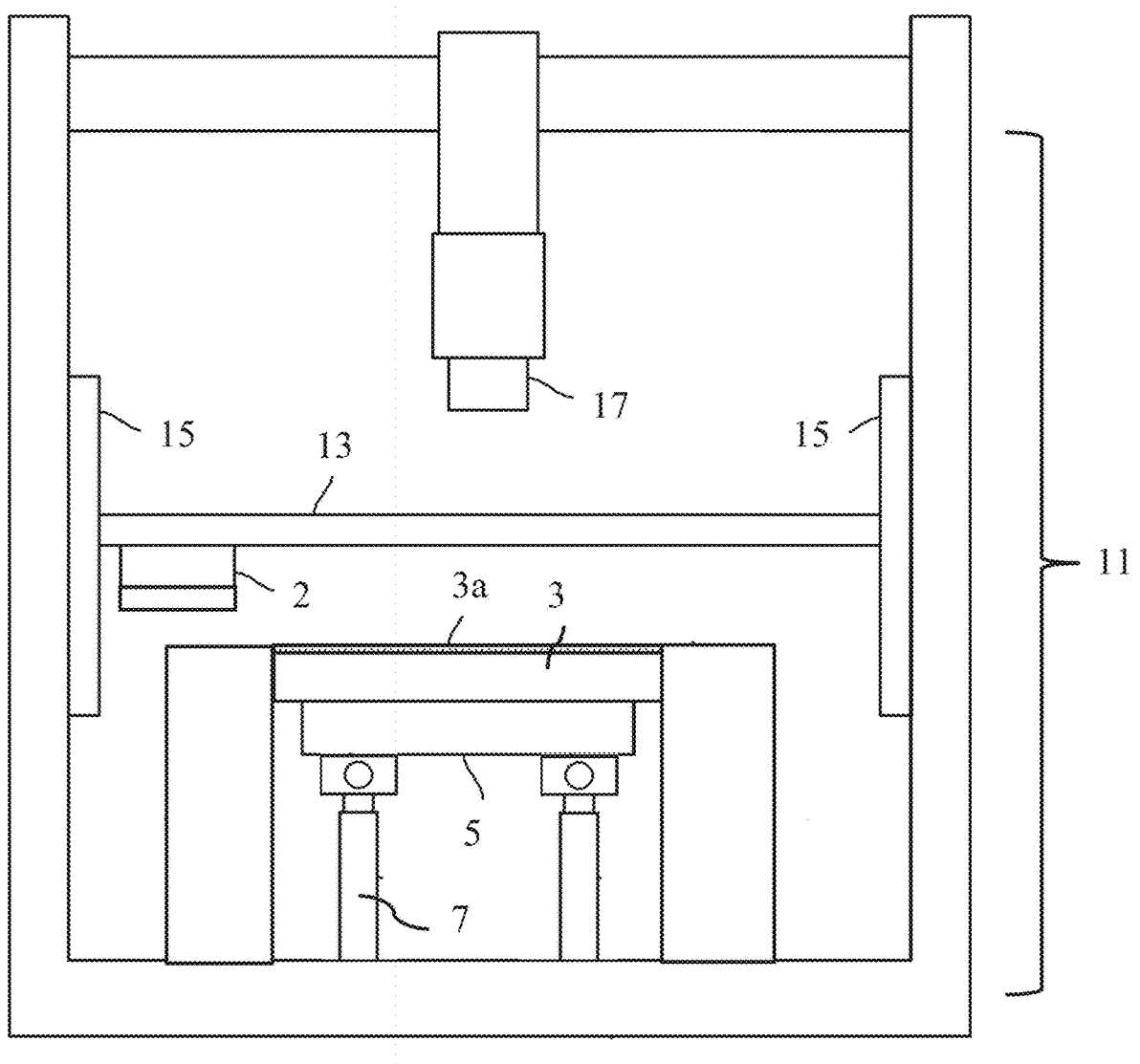
FIG. 1 shows a schematic representation of an additive manufacturing system according to some embodiments.
Figure 2A:
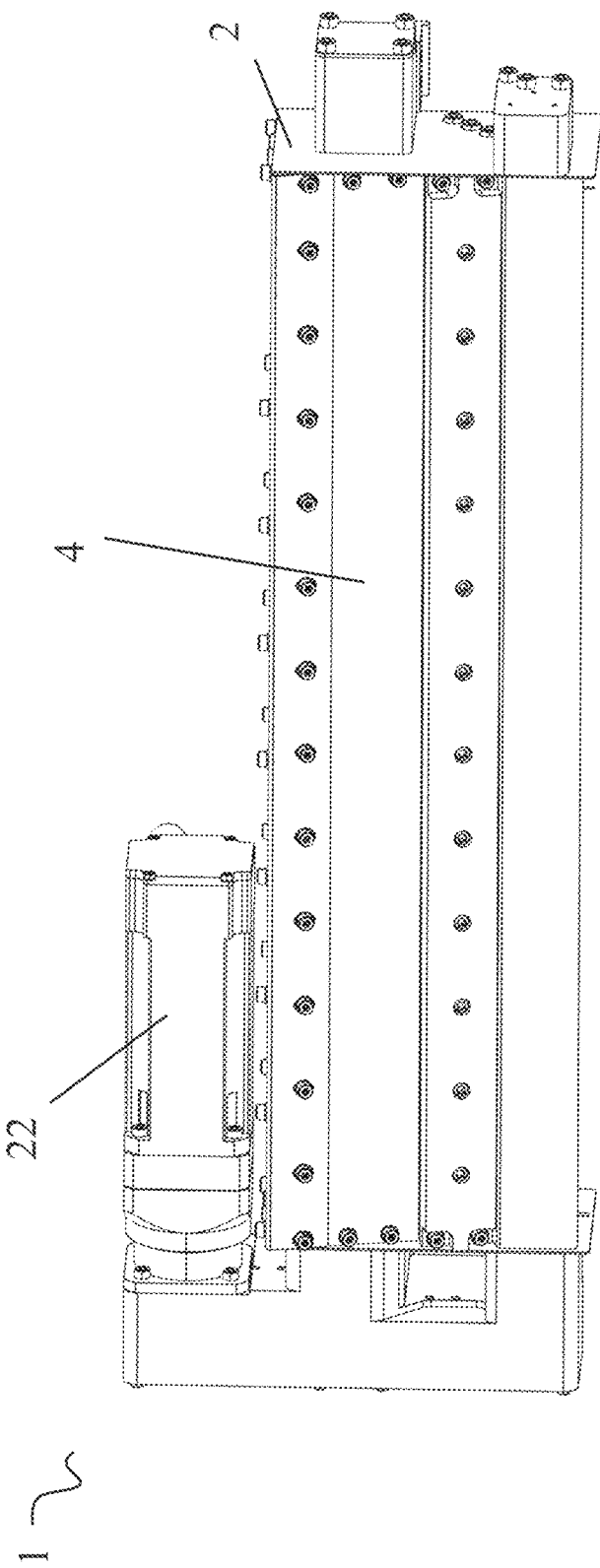
FIG. 2A shows a front perspective view of a hopper, according to some embodiments.
Figure 2B:
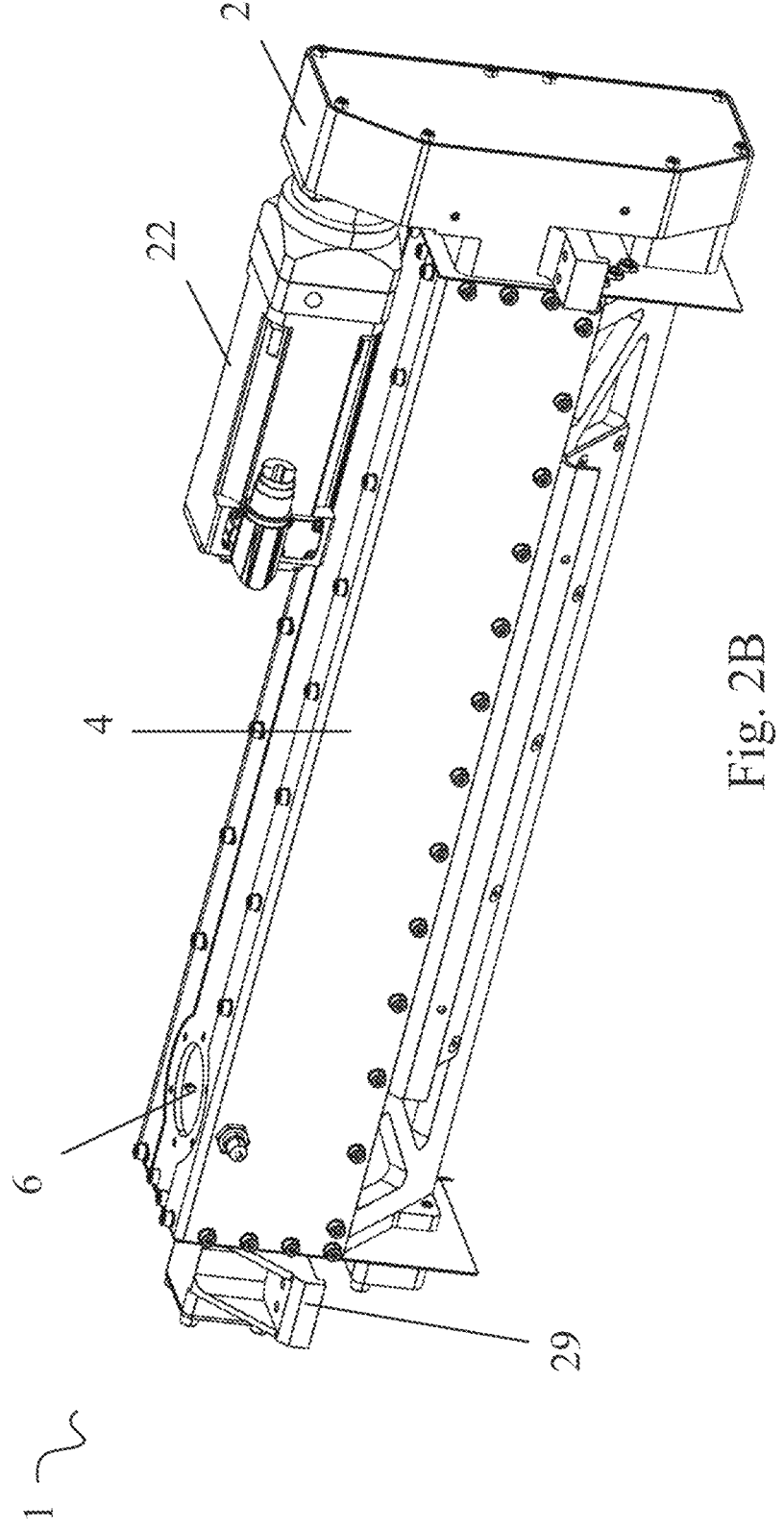
FIG. 2B shows a rear perspective view of the hopper of FIG. 2A.
Figure 2C:
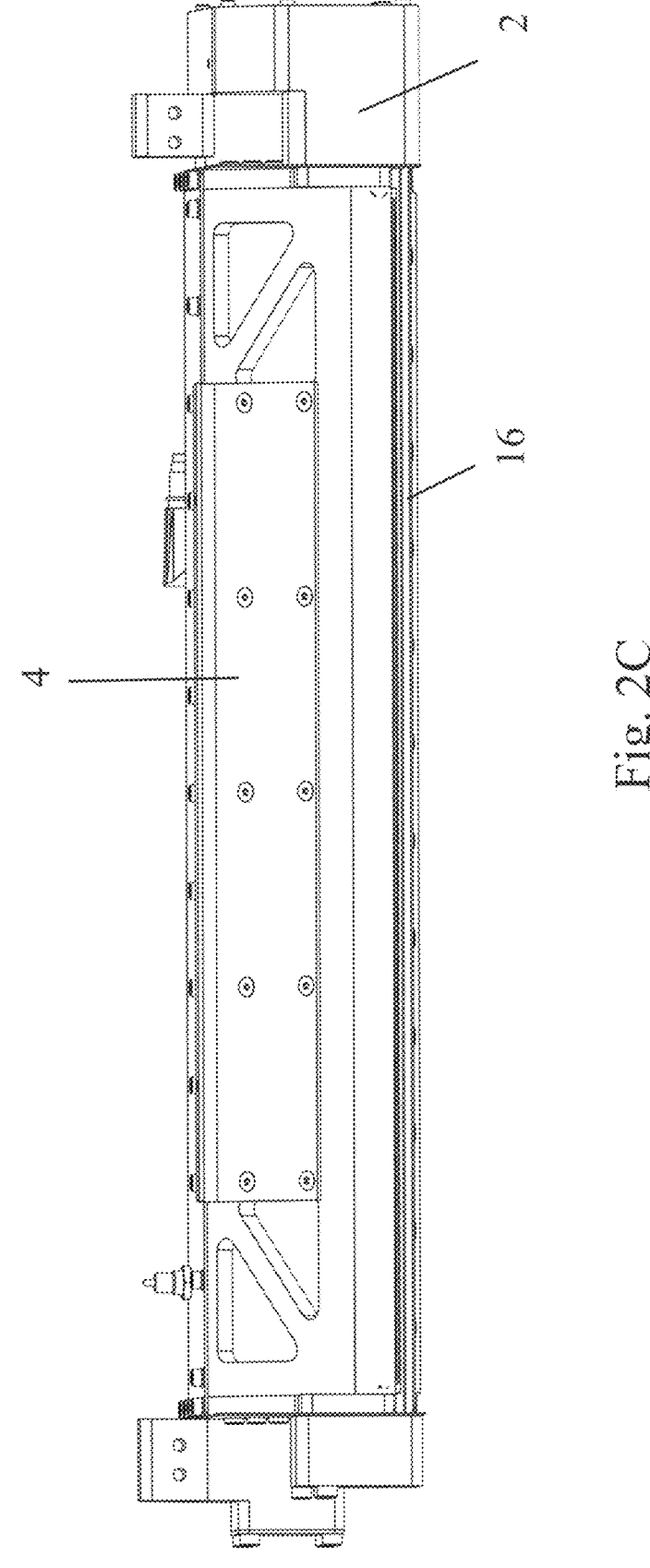
FIG. 2C shows a bottom view of the hopper of FIG. 2A.
Figure 2D:
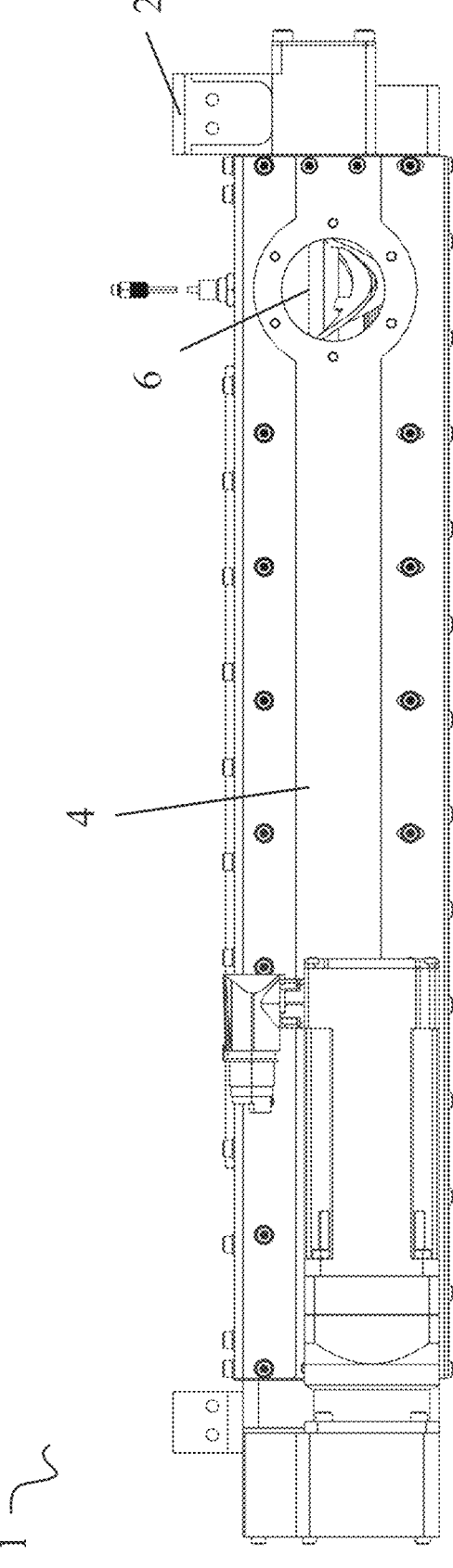
FIG. 2D shows a top view of the hopper of FIG. 2A.
Figure 2E:
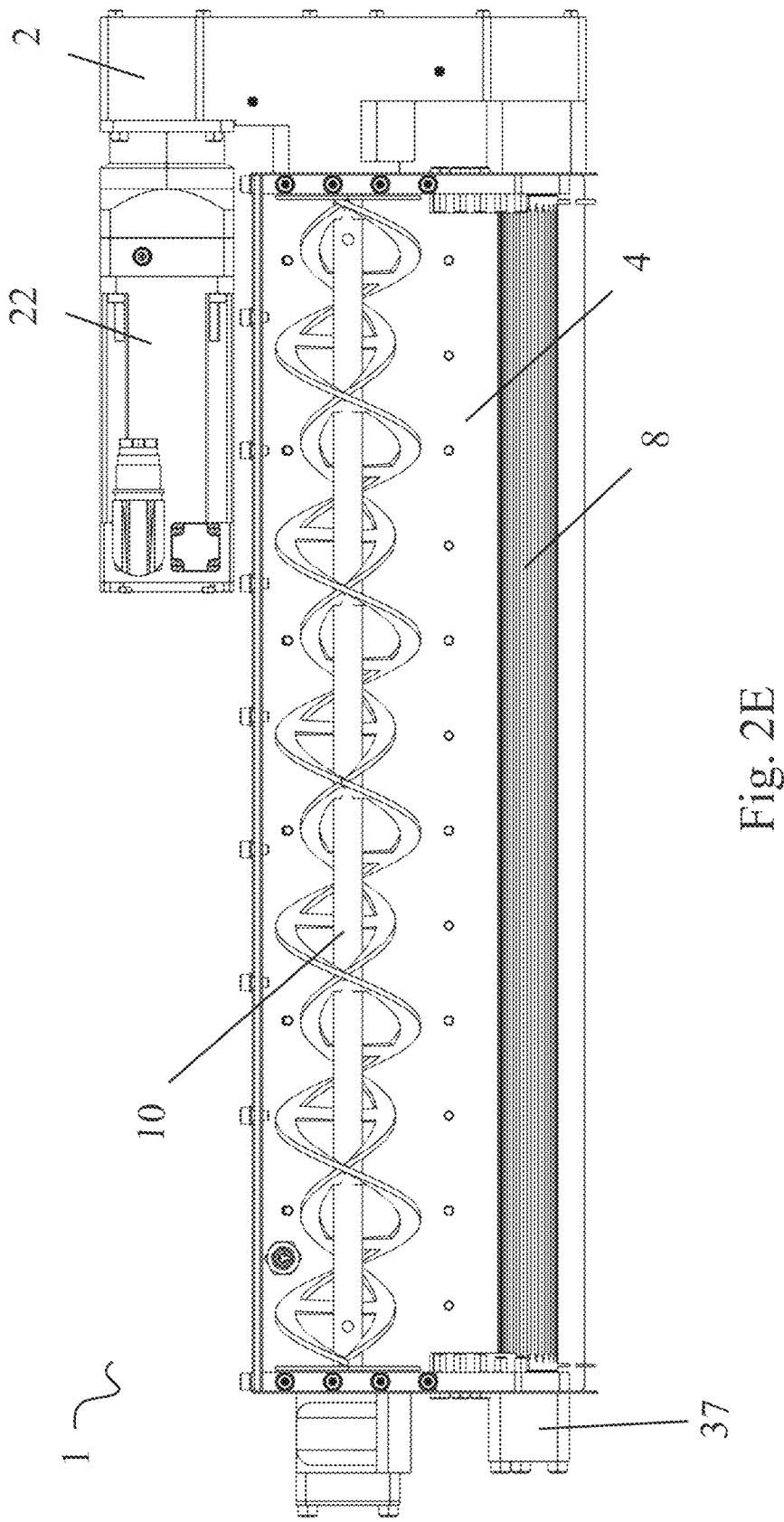
FIG. 2E shows a rear view of the hopper with visible internal components, according to some embodiments.

FIG. 1 depicts one embodiment of an additive manufacturing system 11 that incorporates one or more inventive features. In some embodiments, the system 11 includes a build plate 3 mounted on a base 5, which is in turn mounted on one or more vertical supports 7. The one or more vertical supports 7 can include any appropriate number of supports configured to support the build plate 3, and the corresponding build surface, at a desired position and/or orientation. For example, the supports 7 may include one or more actuators configured to control a vertical position and/or orientation of the build plate 3. In some embodiments, the additive manufacturing system may also include an optics assembly 17 that is supported vertically above and oriented to direct laser energy towards the build plate 3. The optics assembly 17 may be optically coupled to one or more laser energy sources, not depicted, to direct laser energy in the form of one or more laser energy pixels onto the build surface of the build plate 3 to selectively melt powder material on the build surface. To facilitate movement of the laser energy pixels across the build surface, the optics assembly may be configured to move in one, two, or any number of directions relative to the build surface of the build plate. To provide this functionality, the optics assembly may be mounted on a gantry, or other actuated structure, that allows the optics unit to be scanned in a plane parallel to the build surface of the build plate 3.

The laser energy may be used to fuse precursor material 3a, such as a powdered metal material, in selected areas on the build surface to create a desired shape of fused material on the build surface. To provide the precursor material 3a on the build surface, the additive manufacturing system may include a powder deposition system that includes a hopper 1 mounted on a horizontal motion stage 13 that allows the hopper 1 to be moved across either a portion, or entire, surface of the build plate 3. As the hopper 1 traverses the build surface of the build plate 3, the hopper 1 may deposit and/or smooth the precursor material 3a, such as a powder, on the build plate to provide a layer of precursor material with a predetermined thickness on top of the underlying volume of fused and/or unfused precursor material deposited during prior formation steps. Smoothing of the powder layer may be done by a recoater blade and/or an electrostatic recoater, as is known in the art. The hopper 1 may be moved vertically relative to the build plate 3 by a vertical motion stage 15, e.g., to provide subsequent layers of precursor material 3a on the build surface as a part is built. Alternately, the supports 7 may move the build plate 3 downwardly for each deposited layer of precursor material 3a and the hopper 1 may remain vertically stationary.

In some embodiments, the vertical motion stages, horizontal motion stages, and gantry may include any appropriate type of system configured to provide the desired vertical and/or horizontal motion. This may include supporting structures such as: rails; linear bearings, wheels, threaded shafts, and/or any other appropriate structure capable of supporting the various components during the desired movement. Movement of the components may also be provided using any appropriate type of actuator including, but not limited to, electric motors, stepper motors, hydraulic actuators, pneumatic actuators, electric actuators, and/or any other appropriate type of actuator as the disclosure is not so limited.

Figure 3A:
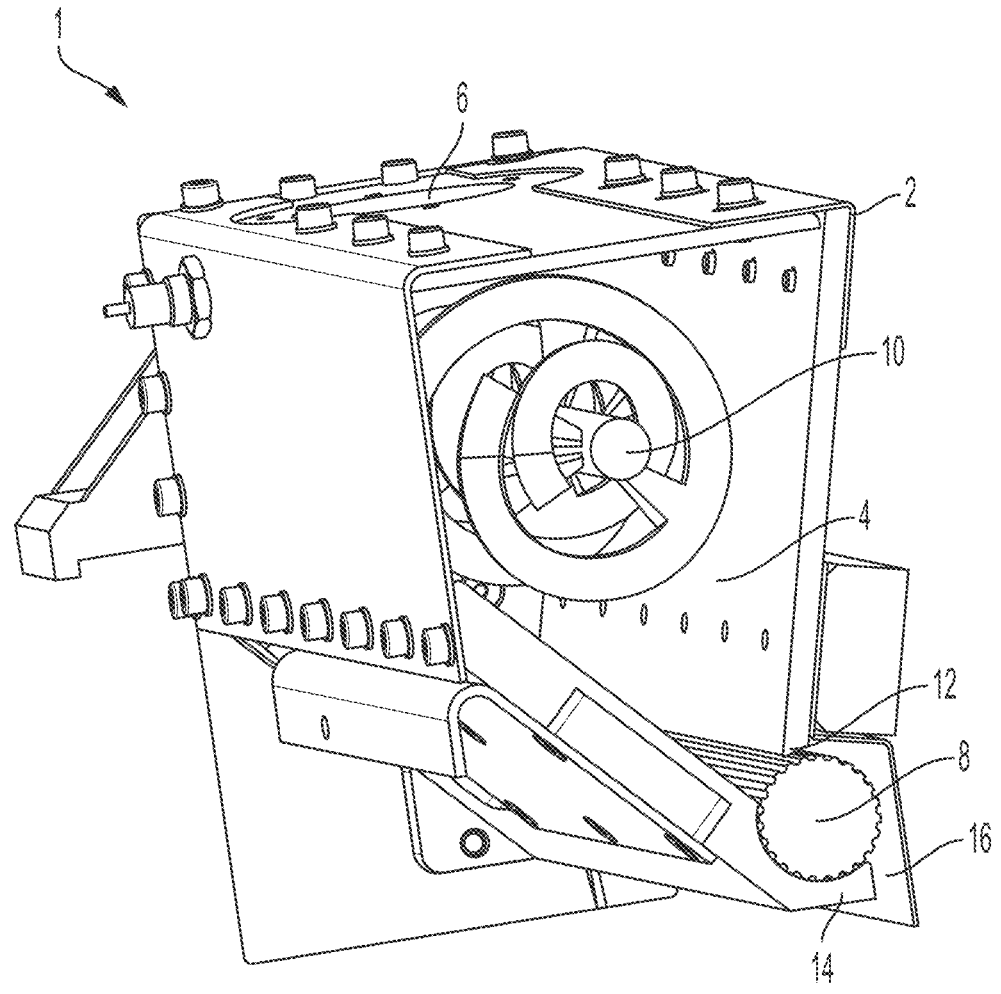
FIG. 3A shows a perspective cross sectional view of a bopper, according to some embodiments.
Figures 3B, 3C:
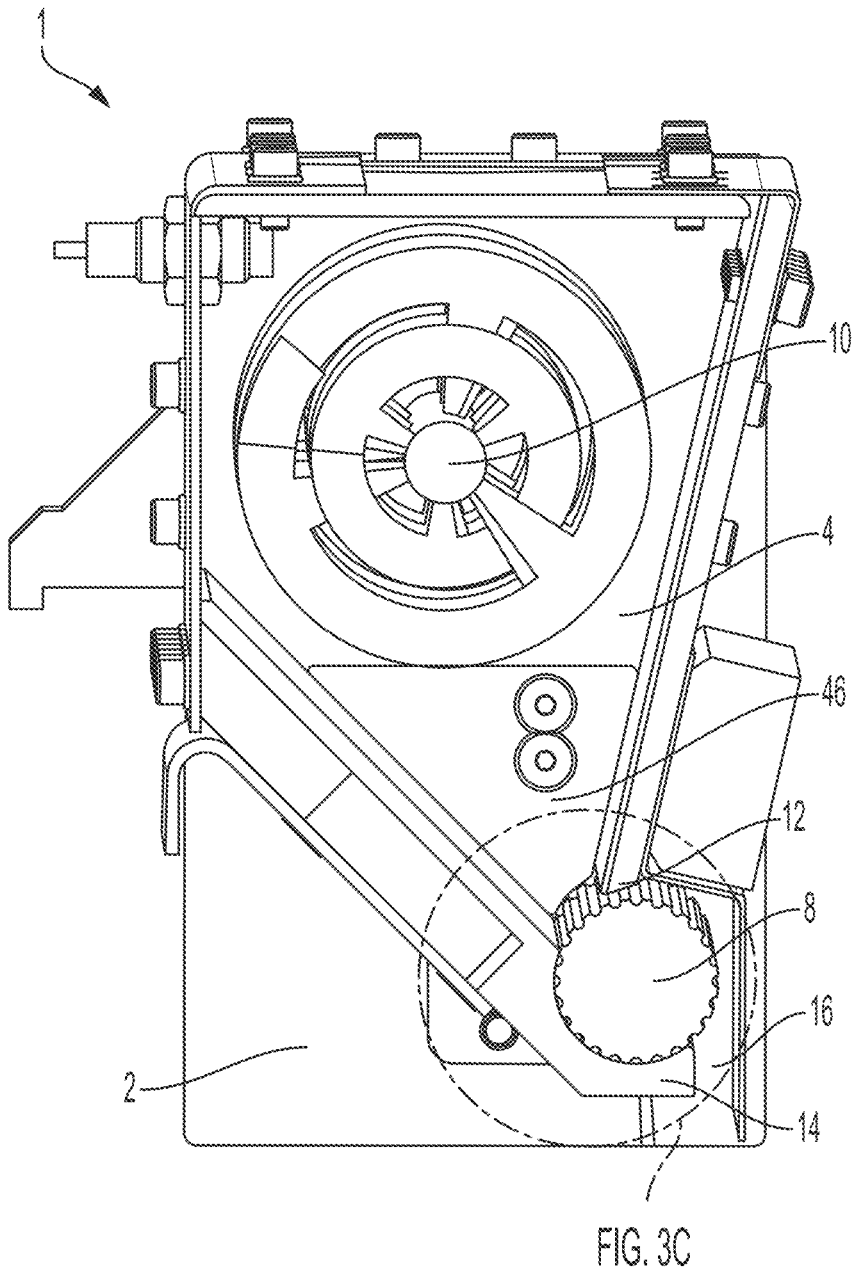
FIG. 3B shows a side cross sectional view of the hopper of FIG. 3A.
FIG. 3C shows a close-up view of a spline in FIG. 3B.
Figure 3C:
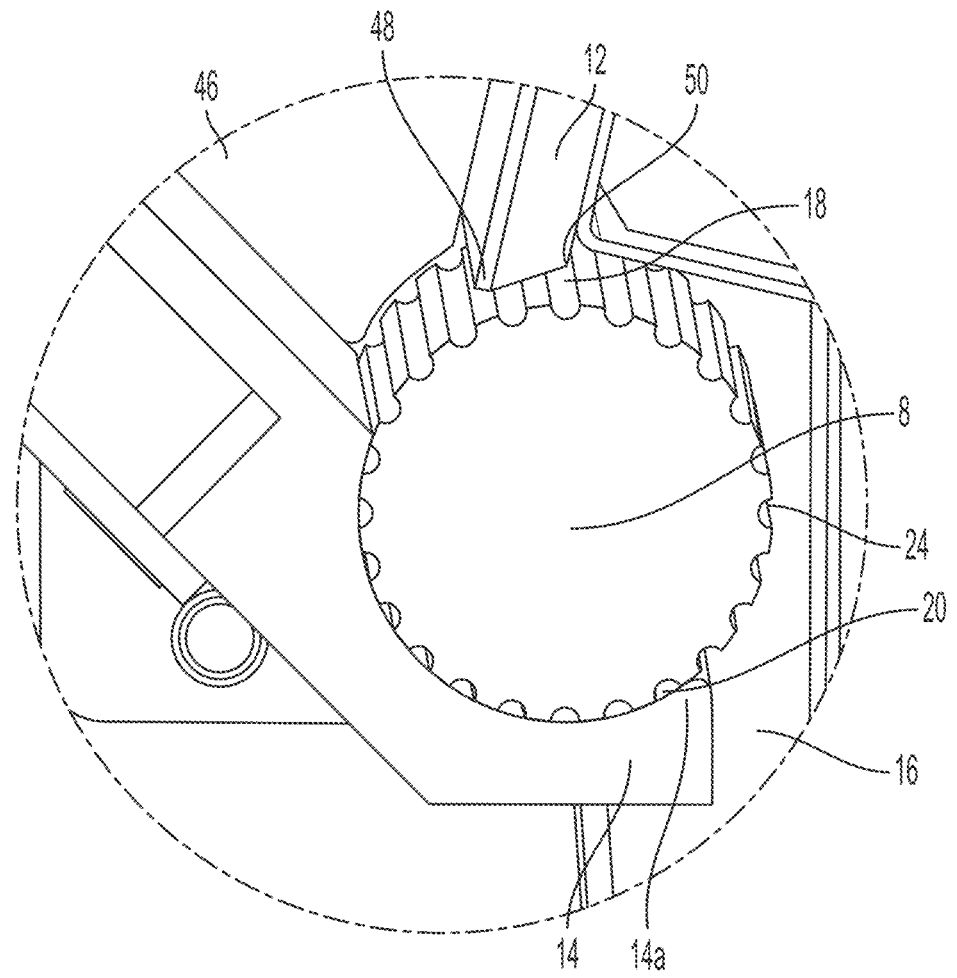

In some embodiments, a hopper may include a rotating element such as a spline shaft configured to dispense powder material from the hopper. The rotating element may permit accurate control of powder dispensing using a relatively simple and reliable structure. This in contrast to some prior dispensing systems, e.g., that employ a movable gate to control powder dispensing, which are incapable of accurately controlling a rate of powder dispensing. FIGS. 2A-2E and FIGS. 3A-3C depict an embodiment of a hopper including a rotating element for dispensing powder material in an additive manufacturing system such as that in FIG. 1. The hopper 1 includes a hopper body 4 that includes an outer casing 2 and defines an inner volume to hold a powder material. Powder material can be provided into the inner volume of the hopper body 4 through a powder inlet 6 on a top surface of the hopper 1, and the powder material can be dispensed through an exit opening 16 of the hopper body 4 based on rotation of a spline 8 positioned at the exit opening 16. The powder inlet 6 may be located on the top surface at a position offset from a longitudinal center of the hopper 1, e.g., near a longitudinal end of the hopper body 4. The exit opening 16 and spline 8 may span across at least a portion of a longitudinal length of the hopper body. In some embodiments, the exit opening 16 and spline 8 may extend across a majority of the longitudinal length of the hopper body 4. An auger 10 may be configured to move powder material within an inner volume of the hopper body 4 to create an even distribution of powder material within the hopper body, e.g., over the spline 8, which may enable an even distribution of powder material to be fed to the spline 8 to dispense the powder material. An actuator 22 may be employed to rotate the auger 10 and/or spline 8. In some embodiments, the hopper 1 may have downwardly inclined surfaces, as seen in FIGS. 3A and 3B, to at least in part promote movement of the powder material in the hopper body 4 to the spline 8, e.g., through the force of gravity.

The hopper body 4 may have any suitable interior geometry and dimension. For example, depending on an amount of powder material to be held within the hopper body 4, the inner volume of the hopper body may be configured to hold enough powder material for at least twenty layers of print (or selective fusion) operations. In some embodiments, the hopper body 4 may comprise at least one of aluminum, stainless steel, and/or other suitable materials. For example, portions of the hopper 1 which may come into direct contact with the powder material may comprise a sterilizable material, such as stainless steel, suitable for forming components used in medical procedures. Other portions of the hopper may comprise non-sterilizable materials such as aluminum, and in some embodiments, a hopper may be constructed from a combination of different materials, e.g., to minimize a weight and/or cost of the hopper.

Figure 4A:
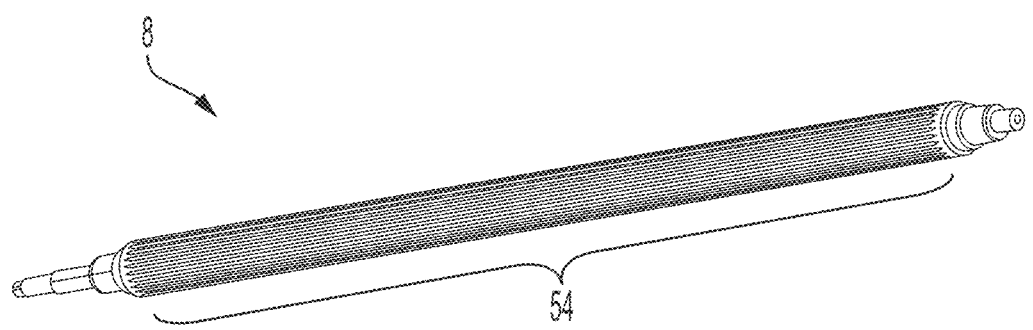
FIG. 4A shows a perspective view of a spline, according to some embodiments.
Figure 4B:
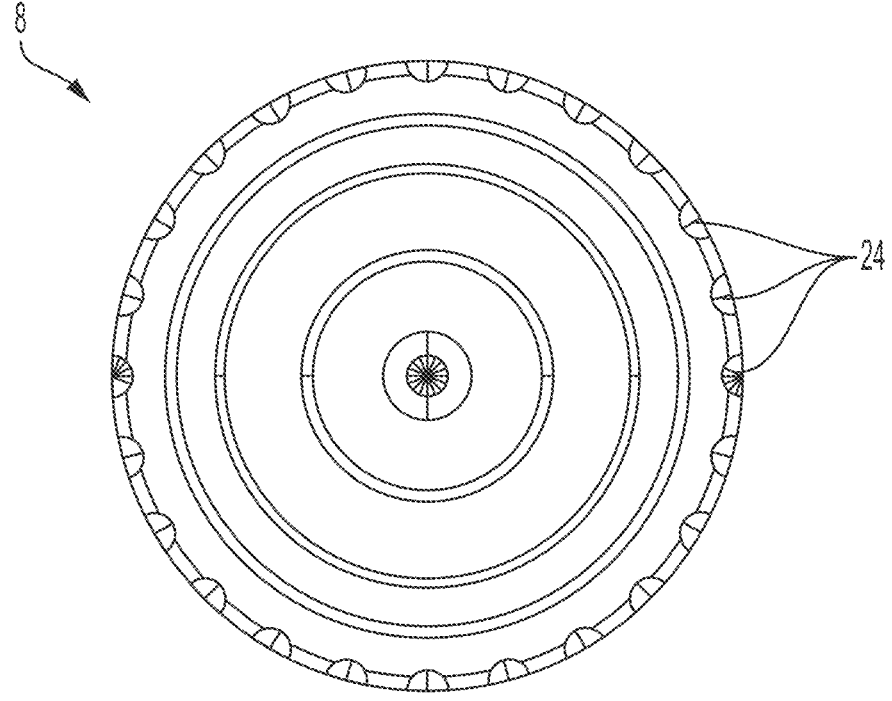
FIG. 4B shows a cross sectional view of the spline of FIG. 4A along the longitudinal axis of the spline.

In some embodiments, the spline 8 may be configured to carry powder material from the inner volume of the hopper body and out of the hopper body 4 through the exit opening 16, as can be seen in FIGS. 3A-3C. Powder dispensed by the spline 8 from the exit opening 16 may fall to the build surface, and may be smoothed or recoated as necessary, e.g., using a recoater blade and/or electrostatic recoater. The spline 8 may be rotated in a direction relative to the hopper body 4, e.g., so portions of the spline in the inner volume of the hopper body move upwardly and toward an upper end 18 of the exit opening 16 (clockwise in FIGS. 3A-3C) to dispense the powder material from the exit opening 16. The spline 8 may comprise cavities 24, which may have a concave shape in a longitudinal cross section of the spline (see FIG. 4B) and may extend along a length of the spline 8, e.g., parallel to a longitudinal axis of the spline 8 (see FIG. 4A). The cavities 24 may assist the spline in carrying powder material to and through the exit opening 16 upon rotation of the spline 8. In some embodiments, the cavities 24 may have a concave semicircular shape in longitudinal cross section, although other configurations such spherical pits, ridges, square or v-shaped grooves, etc. may be employed. In some cases, the cavities 24 may extend continuously along the longitudinal length of the spline, but in some embodiments the cavities may be discontinuous and/or evenly distributed along a length of the spline. In some embodiments, a spline may be configured with a rough surface which allows powder material to be moved by the spline through a force of friction instead of or in addition to employing cavities. In some embodiments, the powder material may move with the outer surface of the spline 8 through a force of friction. For example, the weight of the powder material within the hopper body 4 over the spline 8 may impose a frictional force between the powder material and the surface of the spline. The frictional force may cause the powder material to be moved along with the spline during the rotation of the spline 8. As the powder material carried on the spline 8 moves past the uppermost point of the spline 8 near the upper end 18 of the exit opening 16, the powder material may fall from the spline and be dispensed from the exit opening 16 of the hopper 1. The powder material may fall off at least in part due to a force of gravity, as the powder material is subjected to a force of gravity at the exit opening 16.

In some embodiments, the hopper 1 may have a bottom interface 14 to prevent powder material from escaping from of a lower end 20 of the exit opening 16. The bottom interface 14 may extend over a lowermost portion of the spline 8 and in some cases extend above the lowermost portion of the spline on the exit opening 16 side of the spline. If a gap between the lower portion of the spline 8 and the bottom interface 14 is suitably small or otherwise arranged, powder may be prevented from exiting the hopper 1 from a space between the spline 8 and the bottom interface 14. In some embodiments, a gap between the bottom interface 14 and a surface of the spline (e.g., at or near the lowermost portion of the spline) may be between 1 mm and 4 mm. The size of the gap between the bottom interface 14 and the spline 8 may be configured for different conditions, e.g., to prevent the spline from contacting the bottom interface while maintaining a suitable spacing such that that powder material cannot escape the inner volume of the hopper body 4. In some cases, a leading end 14a of the bottom interface 14 (i.e., a portion of the bottom interface 14 on the exit opening side of the spline) may be positioned above a lowermost portion of the spline, such that the bottom interface 14 is overcentered. For example, the leading end 14a of the bottom interface 14 may be positioned about 3 mm to 4 mm above a lowermost portion of the spline 8 and/or the leading end 14a of the bottom interface 14 may be positioned vertically above the lowermost portion of the spline at a distance of about 5% to 20% of a diameter of the spline 8. This arrangement can help prevent powder from exiting the hopper 1 via any space between the spline 8 and the bottom interface 14, e.g., because powder must move upwardly against gravity to pass over the leading end 14a of the bottom interface 14 to exit the hopper. In some cases, the bottom interface 14 may function to help remove powder on the outer surface of the spline 8 that does not dislodge from the spline during dispensing. For example, any powder material that remains on the surface of the spline 8 after passing to the upper end of the exit opening 16 despite the force of gravity may be dislodged from the spline upon contact with the leading end 14a of the bottom interface 14. In some embodiments, the bottom interface 14 may closely conform to the shape of the spline 8. e.g., over an arcuate length of 10 to 180 degrees and may extend over the spline 8 in portions on either side of the lowermost portion of the spline. In some embodiments, the bottom interface 14 need not closely conform to the shape of the spline and may only be suitably spaced from the spline 8 in one or more areas, such as near a lowermost portion of the spline 8 and/or near the leading end 14a of the bottom interface 14, to suitably prevent powder from exiting the hopper through a space between the spline 8 and the bottom interface 14.

In some embodiments, a hopper 1 may include a metering blade 12 to help control a rate at which the spline dispenses powder from the hopper and/or to help prevent unwanted exit of powder from the hopper, e.g., by preventing passage of powder over the uppermost portion of the spline and through the exit opening 16 when the spline 8 is not rotating. A metering blade 12 of the hopper 1 may be positioned above an upper portion of the spline 8 in the interior space of the hopper and/or may limit an amount of powder that passes through a gap between the metering blade 12 and the spline 8 during rotation of the spline 8. The metering blade 12 may be overcentered with regards to the uppermost portion of the spline, e.g., a gap between the metering blade 12 and the spline 8 may be positioned below an uppermost portion of the spline 8, as shown in FIGS. 3A-3C. This arrangement can help prevent unwanted flow of powder through the gap between the metering blade 12 and the spline 8 and to the exit opening 16 when the spline is not rotating. To ensure the powder material can be dispensed from the spline and through the exit opening, the metering blade 12 may be configured to avoid compacting the powder material on the spline as the spline rotates. In some embodiments, a metering blade 12 may be designed to avoid compaction of the powder material on the spline by having a leading edge 48 of a surface of the metering blade positioned closer to the spline 8 than a trailing edge 50 of the surface of the metering blade 12. The different spacing between the leading edge 48 to the spline 8 and the trailing edge 50 to the spline 8 may create a departure angle between the metering blade and the spline, which may prevent and/or minimize compaction of powder material on the spline as the metering blade interacts with the powder material. In some cases, the metering blade 12 may have a surface, e.g., extending between the leading edge 48 and the trailing edge 50 that diverges away from the spline in a direction from the leading edge toward the trailing edge. In some embodiments, the metering blade may also be configured with a blunt edge, e.g., a rounded, beveled, and/or chamfered edge at the leading edge 48, to avoid and/or minimize compaction of powder material on the spline. Furthermore, a blunt edge may be easier to manufacture and decreases risks and dangers associated with maintaining the hopper. In some embodiments, the gap between the metering blade and the spline may be between 200 μm to 2 mm. In some embodiments, the gap between the metering blade and the spline may be between 100 μm and 300 μm. The gap between the metering blade and the spline may be set with a shim. In some embodiments, the metering blade 12 may be formed as part of an inner and/or outer wall of the hopper, e.g., that forms at least a part of an outer casing 2 of the hopper 1. In some embodiments, the metering blade may be a separate component from the outer casing of the hopper.

Figure 5:
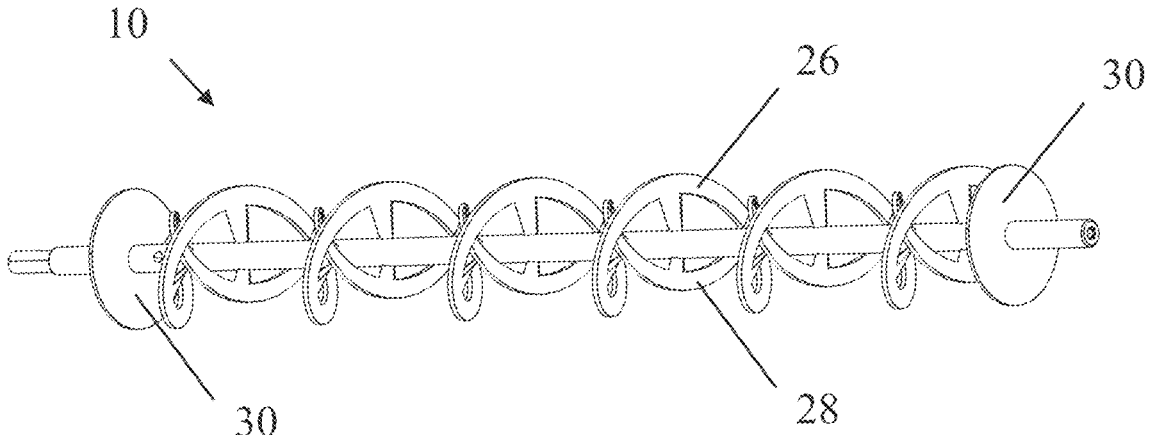
FIG. 5 shows a perspective view of an auger, according to some embodiments.

In some embodiments, an auger may be configured in the inner volume of the hopper to distribute powder material within the hopper, e.g., so the powder material is relatively evenly distributed over the spline 8 along its length. As noted above, pressure of the powder material over the spline may influence how powder is dispensed and helping to ensure even distribution of powder in the hopper can aid in effective powder dispensing. In some cases, an auger 10 may be configured to move powder in two opposed directions in response to movement of the auger in one direction (such a rotation about its longitudinal axis). For example, as shown in FIG. 5, the auger 10 may have a double helix configuration which includes two helical ribbons or elements. The auger 10 may include two ribbon flights, e.g., a first flight 26 and a second flight 28. The first flight 26 may have a greater radius than the second flight 28, and the second flight 28 may be nested within the first flight 26. The first and second flights 26, 28 may have a same pitch, or different pitches. The double helix configuration may move the powder material within the hopper body in two opposed directions upon the auger being rotated in a single direction about the longitudinal axis of the auger. For example, for a single rotation direction the first flight 26 may move powder to the right in FIG. 5, while the second flight moves powder to the left. The two opposed directions of movement of the powder material may be parallel to the longitudinal axis of the auger, where the first flight 26 moves powder material in a first direction and the second flight 28 moves powder material in a second direction. To enable this powder movement, the inner volume of the hopper 1 may be provided with powder such that an upper level of the powder is at or above the second flight 28, e.g., so both the first and second flights 26, 28 can operate on the powder.

In some embodiments, the hopper body 1 may be elongated, and powder material may enter the hopper body 1 through a powder inlet 6 near a longitudinal end of the hopper body. The powder material in the hopper body may be moved by the auger 10, which can evenly distribute the powder material from near a longitudinal end of the hopper body along the entire longitudinal length of the hopper body. The auger 10 may extend along at least a portion of a longitudinal length of the hopper body, and in some embodiments, the auger may be configured to span a similar portion of the hopper body as a spline and/or exit opening used to dispense the powder from the hopper. While the figures depict a double helix auger, other types of mixing or powder movement apparatuses may be employed including but not limited to screw augers, planetary mixers, drum mixers, and flute augers are also contemplated. Additionally, different configurations of the double helix auger may also be contemplated. For example, the pitches, radii, and/or direction of mixing of the flights within the double helix auger may be modified.

In some embodiments, the hopper may have a plate disposed between the auger and the outer casing of the hopper body to help prevent powder from escaping the hopper body. Plates 30 may be disposed between the auger 10 and the outer casing on both longitudinal ends of the auger, and a radius of each plate may be greater than a radius of the auger.

In some embodiments, a hopper may include one or more powder seal components to minimize and/or prevent powder material from exiting the inner volume of the hopper body and/or to prevent any powder material that exits the inner volume in an unwanted way from being used in the additive manufacturing system. For example, a shield may be provided on one or both longitudinal ends of the spline and the shield may be configured such that powder material passing through an interface between the shield and the spline collects in a space defined at least in part by the spline and the shield. Powder material collected in the space may be prevented from reentering the inner volume of the hopper for use in making a printed part, e.g., because powder entering the space may fall downwardly from the interface into the space where the powder is effectively trapped. Powder collected in the space may be removed by disassembling one or more portions of the hopper.

In some embodiments, a shield may be provided for one or both longitudinal ends of the spline to resist movement of powder out of the inner volume of the hopper and to prevent powder material that exits the inner volume from reentering into the inner volume of the powder hopper. In some cases, it may be desirable to prevent powder that exits the inner volume in an unwanted way from reentering the inner volume and being used to create a printed part because the reentering powder may carry contaminants that can affect the quality or other characteristics of a printed part. For example, printed parts that are used in some medical procedures may need to be sterilizable and thus must contain only materials, such as stainless steel, that are sterilizable. However, portions of the hopper, such as the outer casing 2, may be made of materials, such as aluminum, that are not sterilizable. Such non-sterilizable materials may be used to form parts of the hopper that normally do not contact powder material to reduce cost and/or mass of the hopper 1. However, if powder material exits the inner volume and contacts a non-sterilizable material, the powder may be contaminated and not usable to form a printed part.

Figure 6:
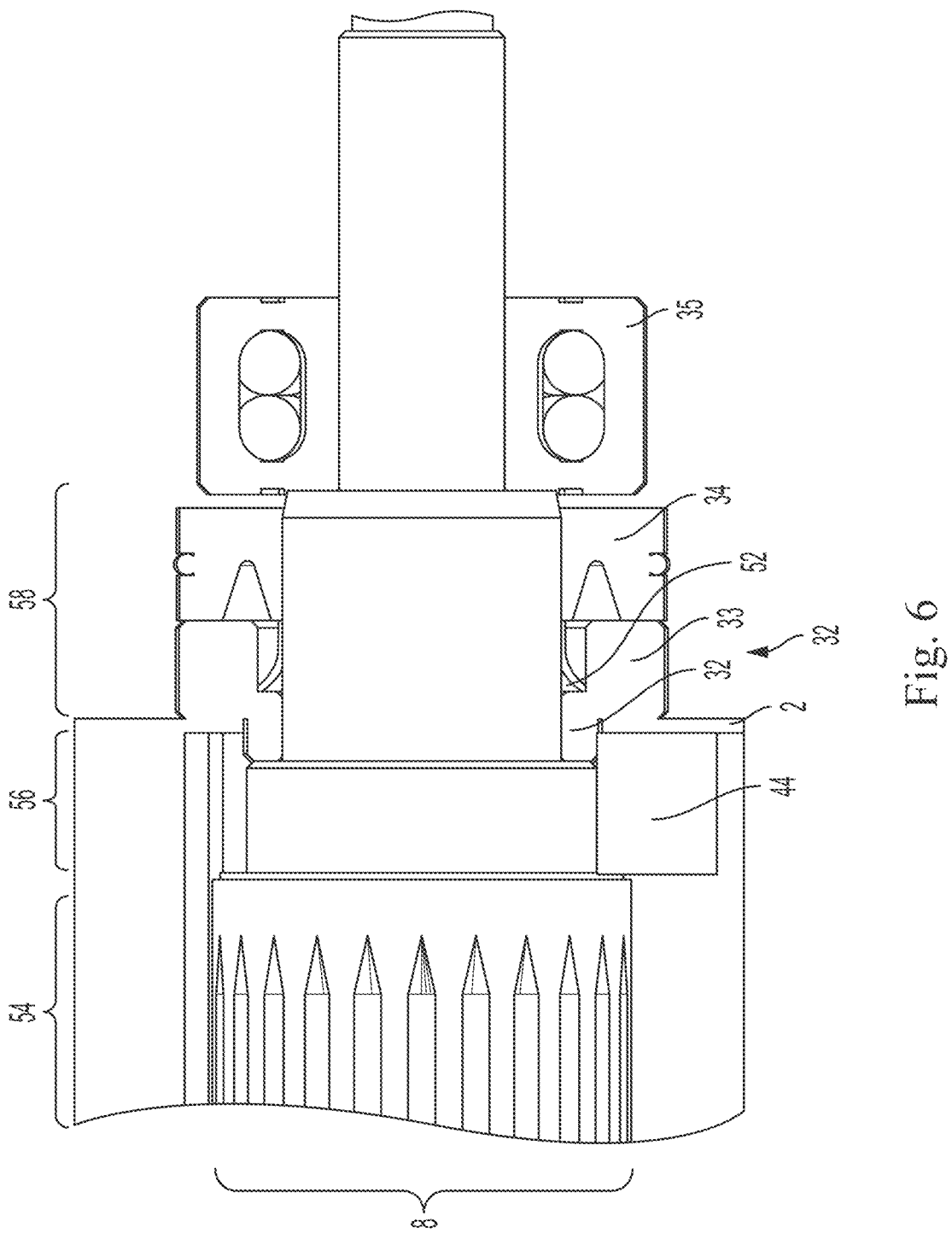
FIG. 6 shows a cross sectional view of a powder seal mechanism of a hopper, according to some embodiments.

To avoid problems associated with such powder reentry, a shield may be configured to define, at least in part, a space to collect powder material which passes through an interface between the shield and the spline. As can be seen in FIG. 6, a shield 31 may include a first portion 32 and a second portion 33. The first portion 32 of the shield 31 may have a first inner diameter that defines an interface with a third portion 58 of the spline, e.g., which may have a different diameter than first and/or second portions 54, 56 of the spline 8. Thus, in some embodiments the longitudinal end of the spline 8 may be stepped so as to have a first portion 54 in the inner volume of the hopper body that has a first radius, a third portion 58 at the interface with the shield 31 having a third radius, and a second portion 56 between the first and third portions having a second radius. As can be seen in FIG.

6, the first radius may be larger than the second and third radii, and the second radius may be larger than the third radius. The interface between the shield 31 and spline 8 may be formed by a gap and/or a contacting area between the first portion 32 of the shield 31 and the spline 8, and may resist powder material from moving out of the hopper inner volume. Thus, the inner diameter of the first portion 32 may be close in size to a diameter of the third portion 58 of the spline 8 to help resist movement of powder out of the inner volume of the hopper. The second portion 33 of the shield 33 may be positioned outboard of the first portion 32 and have second inner diameter that is larger than the first inner diameter of the first portion 32. Thus, powder that moves in an outboard direction through the interface between the first portion 32 and the third portion of the spline 8 will fall downwardly from the interface into a space 52 defined at least in part by the shield 31 and the spline 8. Once powder falls into this space, the powder is effectively trapped and cannot reenter the powder holding area of the hopper. In some embodiments, the space where powder may be trapped by the shield 31 may be defined in part by a seal 34 which may contact the spline 8, e.g., at the third portion 58, and provide a contact seal to prevent movement of powder material past the seal 52. The seal 34 may be any suitable type of contacting seal, such as a lip seal that has a portion which rides on the third portion 58 of the spline 8. While the shield 31, or at least the first portion 32 may be made of a sterilizable material or other non-contaminating material, the seal 34 may be made of or include a non-sterilizable or other potentially contaminating material, e.g., such that contact of powder material with the seal 34 makes the powder unsuitable for use in forming a printed part. One or both ends of the spline 8 may be supported on bearings 35, e.g., a self-aligning bearing that is supported by the outer casing 2 by a cap 37 attached to the outer casing 2 (see FIG. 2E). Use of a self-aligning bearing may help relieve tolerances and/or variations in movement of the spline 8.

In some cases, parts of the shield 31 may conform at least in part to the dimensions and/or geometry of the outer casing 2 of the hopper body. For example, as can be seen in FIG. 6, the second portion 33 of the shield 31 may extend over a portion of an outer surface of the outer casing 2, and the first portion 32 of the shield 31 may be disposed in an opening of the outer casing and be positioned between the outer casing and the spline 8. Thus, in some embodiments, a portion of the outer casing 2 of the hopper body may extend at least in part around a portion of the spline, e.g., which may have a portion that extends through an opening in the outer casing 2. The first portion 32 may have a first outer diameter that is smaller than a second outer diameter of the second portion 33, and the first outer diameter of the first portion 32 may be configured to be received into a corresponding opening of the outer casing 2. Accordingly, a part of the first portion 32 may extend from the outer casing 2 into the inner space of the hopper, and the second portion 33 may extend from outwardly from the outer casing. The conformation of the shield 31 over the outer casing 2 may create a tortuous path to resist passage of powder material through an interface between the shield 31 and the outer casing 2.

Figure 7A:
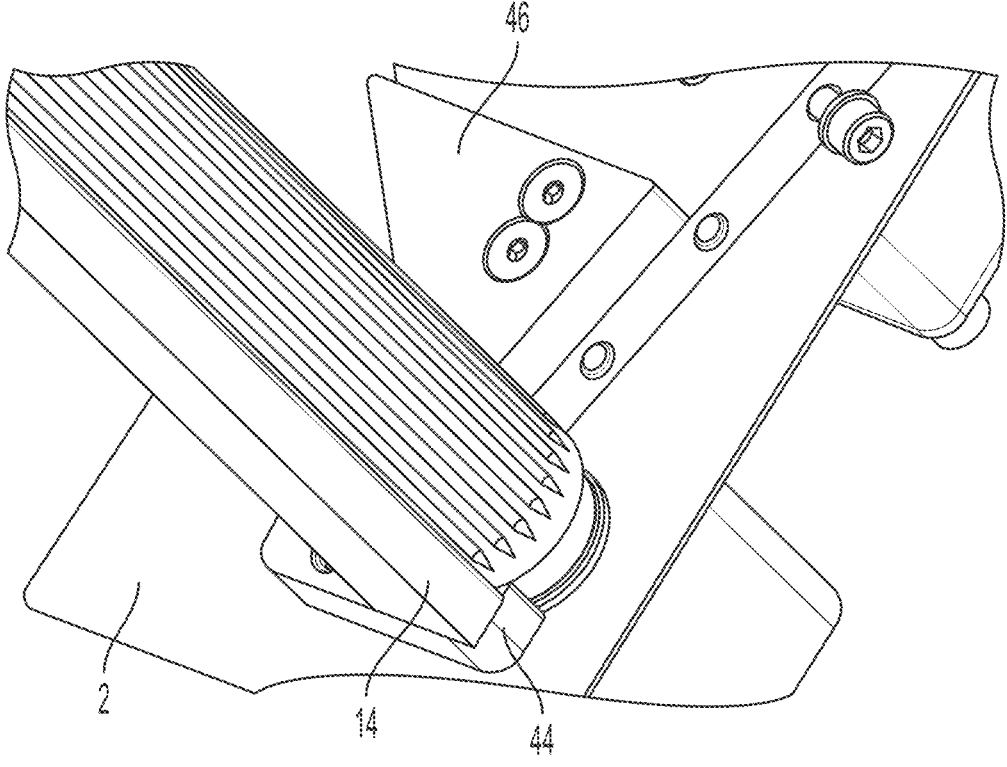
FIG. 7A shows a perspective view of a powder shield arrangement for a hopper, according to some embodiments.
Figure 7B:
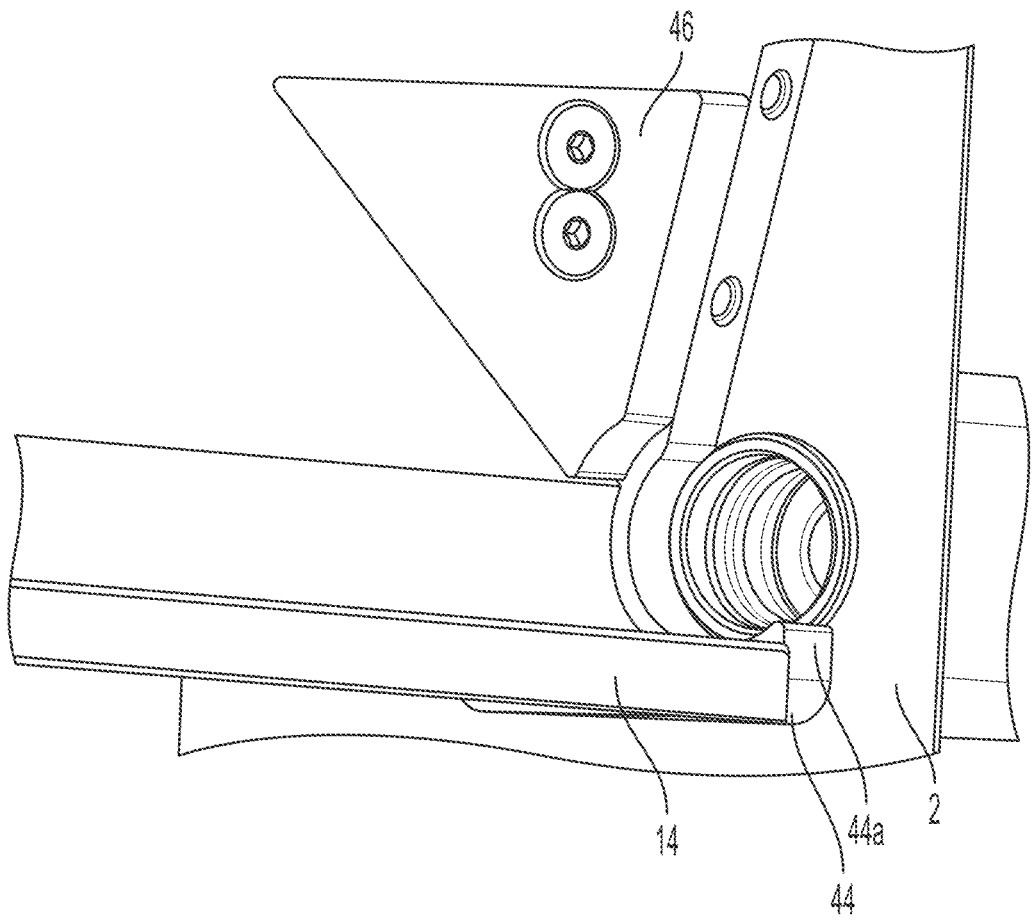
FIG. 7B shows a second perspective view of the powder shield arrangement of FIG. 7A.

Additional components may be employed to help resist movement of powder material along the spline from the inner volume or powder holding area of the hopper to outside areas. For example, as can be seen in FIGS. 6, 7A and 7B, a hook portion 44 may be attached at an inner surface of part of the outer casing 2 and extend at least in part around the second portion 56 of the spline 8, which may have a smaller diameter and/or radius than the first portion 54 of the spline 8 but a larger diameter than the third portion 58. The hook portion 44 may be configured to make contact with powder material in the inner volume, e.g., may be made of a sterilizable or other suitable material. In some cases, the hook portion 44 may be engaged with a part of the first portion 32 of the shield 31, e.g., engage a first outer diameter of the first portion 32 which may have a size approximately equal to the diameter of the second portion 56 of the spline 8. In some cases, this engagement between the hook portion 44 and the first portion 32 of the shield 31 may provide a seal that resists powder movement in the interface between the first portion 32 of the shield 31 and the hook portion 44. Furthermore, an interface between the hook portion 44 and the spline 8 (e.g., at the second portion 56 and/or a vertical wall of the spline 8 between the second portion 56 and the first portion 54) may form a tortuous path which resists powder material movement. As can be seen in FIG. 7A, the hook portion 44 may abut the bottom interface 14 so that powder material cannot pass through the interface between the hook portion 44 and the bottom interface 14. In some embodiments, a leading end 44a of the hook portion 44 may be overcentered relative to the spline 8, e.g., a leading end 44a of the hook portion 44 may be positioned vertically above a lowermost portion of the second portion 56 of the spline 8 at the exit opening 16.

In some cases, movement of powder material out of the inner volume or powder holding area along the spline may be resisted by a block 46 that may be positioned within the inner volume of the hopper body and disposed over at least a part of the first portion 54 of the spline. At least a portion of block 46 may define at least part of the inner surface of the powder holding area in the hopper and the block 46 may be attached to the hook portion 44. The block 46 may have a part that is disposed over the longitudinal end of the first portion 54 of the spline 8, e.g., so the block 46 defines a narrow gap between the block 46 and the spline 8 which limits powder material movement in an outboard direction toward the hook portion 44 and the shield 31. In addition, the cavities 24 on the first portion 54 of the spline may terminate on the spline in an area under the block 46. The termination of the cavities 24 under the block 46 may help prevent movement of powder material along the cavities 24 to areas outboard of the first portion 54 of the spline 8. The block 46 may engage the bottom interface 14, e.g., so powder material cannot move through an interface between the block 46 and the bottom interface 14.

In some embodiments, a rate of powder dispensing, e.g., amount of powder material dispensed over time, of the hopper may be controllable. As described above, powder material may be dispensed from the exit opening as the spline rotates. Therefore controlling a rotational speed, rotational frequency, and/or any other movement of the spline may determine at least in part a rate of powder dispensing. For example, a rate of powder dispensing may be controlled by adjusting speed of an actuator 22 coupled to the spline and/or auger. The rate of powder dispensing may be affected at least in part by factors including but not limited to a type of powder material, geometry and/or dimensions of the spline, and a speed of operation of an actuator associated with operation of the hopper.

Figure 8A:
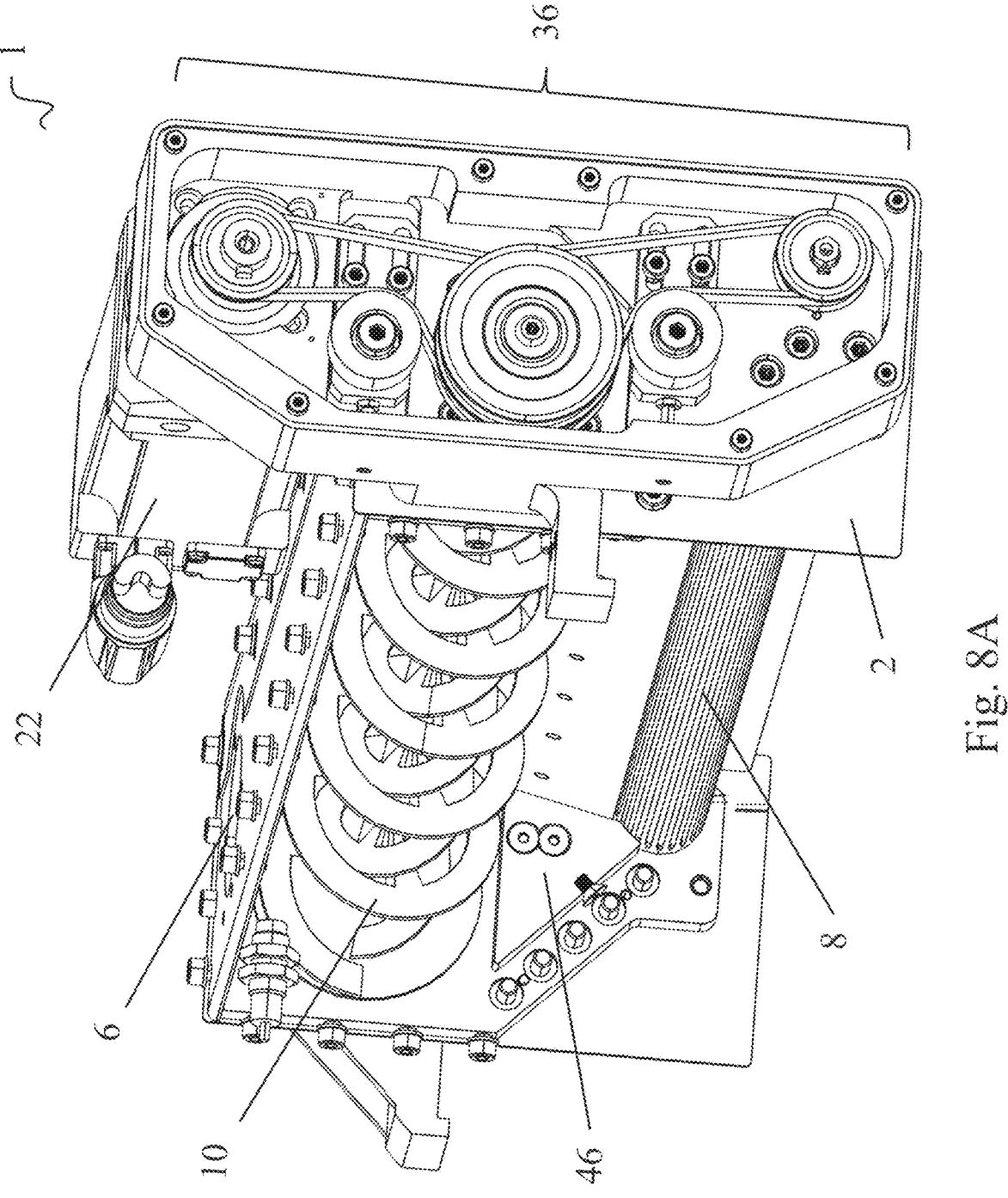
FIG. 8A shows a perspective side view of drive mechanisms of the bopper, according to some embodiments.
Figure 8B:
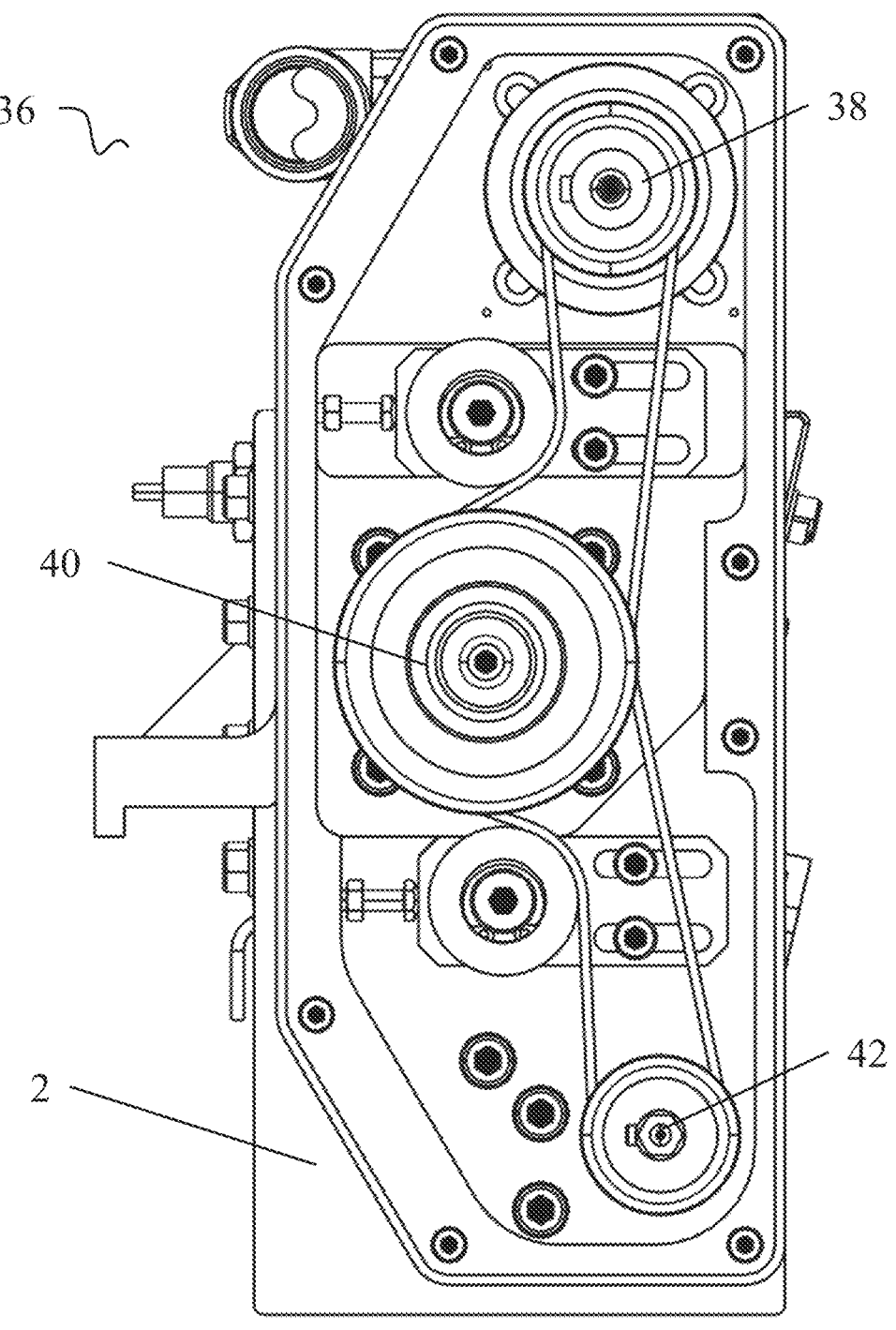
FIG. 8B shows a side view of the drive mechanisms of FIG. 8A.

In some embodiments, a hopper may include a drive system configured to move both the auger and the spline. A common drive system between the auger and the spline may simplify an operational complexity of the hopper, as distributing powder in the hopper and dispensing powder material from the hopper can be controlled using a single actuator. For example, the drive system can be operated to rotate the auger 10 in one direction while powder is delivered to the hopper at the powder inlet 6, e.g., so the powder is distributed evenly across the inner volume of the hopper and over the spline 8. During such distribution, the spline may remain stationary. The drive system may also be operated to rotate the spline 8 to dispense powder from the hopper. During dispensing, the auger 10 may be rotated as well, e.g., to ensure powder is properly distributed during dispensing. FIGS. 8A and 8B depict a drive system 36 that includes an actuator wheel 38 coupled to an actuator 22 (such as a pneumatic motor), an auger wheel 40 coupled to the auger 10, and spline wheel 42 coupled to the spline 8. The wheels 38, 40, 42 are all are connected to a common belt such that rotation of the actuator wheel 38 can rotate the auger wheel 40 and the spline wheel 42. Thus, both the spline and the auger may be directly coupled to an actuator 22 so operation of the actuator can move both the auger and the spline. In some embodiments, the drive system 36 may be configured to rotate the auger 10 in two rotational directions, e.g., the actuator 22 can rotate the actuator wheel 38 in both clockwise and counterclockwise directions to correspondingly drive the auger 10 to rotate in two directions. In some cases, the spline 8 may be coupled to the spline wheel 42 so that the spline 8 can be rotated in only one rotational direction. For example, the spline wheel 42 may be coupled to the spline 8 via a one-way clutch such that the spline 8 only rotates when the actuator 22 is rotated in one direction. Rotation of the actuator 22 in the opposite direction causes the one-way clutch to slip such that the spline 8 does not rotate. Thus, the auger 10 can be rotated alone while the spline 8 remains stationary to distribute powder in the hopper. However, during powder dispensing, both the spline 8 and auger 10 can be rotated. Depending on the gear ratios associated with the actuator wheel 38, auger wheel 40, and spline wheel 42, the auger 10 and spline 8 may rotate at different rates, e.g., the auger 10 may rotate at a faster rate than the spline 8 or vice versa.

In some embodiments, the hopper may include one or more load cells coupled to the hopper body from which powder material can be dispensed to detect a weight of the powder material held by the hopper. For example, one or more load cells 29 (see FIG. 2B) may be provided between or otherwise at a support between the hopper 1 and a horizontal motion stage 13 such that the load cells 29 can provide a signal or other information to a controller regarding a weight of the hopper 1. With information regarding the weight of the hopper 1, and thus powder material held by the hopper, from the load cell(s) 29, a controller may be able to determine a number of layers the powder hopper is able to dispense based on the weight of the powder material in the powder hopper. That is, the controller may store information regarding the weight of the hopper 1 when empty of powder material, and thus determine a weight of powder in the hopper 1. The controller may also be able to control a powder dispensing system, e.g., the spline and/or auger, based on information from the one or more load cells 29. For example, a rate of powder material dispensing may be variable and can be controlled based on variations in the weight of the hopper and powder held by the hopper during dispensing. Thus, the controller may be able to control a rate of rotation of the spline and/or auger during dispensing and/or a movement rate of the hopper across the build surface to dispense a desired thickness or other distribution of powder across the build surface. For example, the controller may operate to dispense a layer of powder material of a particular thickness across the build surface, or may operate to dispense powder material at a particular mass per surface area on the build surface. By receiving real time feedback regarding the weight of powder material in the hopper and a weight of powder dispensed over a period of time, the controller can determine how much powder is being dispensed per unit time and/or per unit distance traveled by the hopper and control the spline movement or other aspects of the hopper system accordingly. As used herein, a load cell may include any suitable sensor or set of sensors capable of directly or indirectly sensing a force or other characteristic indicative of a weight of the hopper and/or its contents. For example, a load cell may include pneumatic sensors, hydraulic sensors, capacitive sensors, piezoelectric sensors, strain gauges and others.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device including one or more processors may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A recoater assembly for depositing a powder material for an additive manufacturing system, the recoater assembly comprising:
a hopper body configured to hold the powder material;

a spline comprising one or more cavities, wherein the spline is configured to rotate relative to the hopper body to dispense the powder material from the hopper body; and a metering blade positioned over a portion of the spline and configured to define a gap between the metering blade and the spline to limit an amount of powder material that passes through the gap in response to rotation of the spline, wherein the metering blade has a surface that faces the spline and diverges away from the spline in a direction from a leading edge of the metering blade toward a trailing edge of the metering blade.

2. The recoater assembly of claim 1, wherein the spline has an uppermost portion and the metering blade is positioned so the gap is located below the uppermost portion of the spline.

3. The recoater assembly of claim 1, wherein the gap has a size of from 200 μm to 2 mm.

4. The recoater assembly of claim 1, wherein the metering blade comprises a blunt edge.

5. The recoater assembly of claim 1, further comprising a bottom interface that extends around a lowermost portion of the spline.

6. The recoater assembly of claim 5, wherein a leading end of the bottom interface is positioned above the lowermost portion of the spline.

7. The recoater assembly of claim 5, wherein a narrowest spacing between the bottom interface and the spline is from 1 mm to 4 mm.

8. The recoater assembly of claim 5, wherein the bottom interface is configured to prevent powder material from exiting the hopper body through a lower end of an exit opening of the hopper body.

9. The recoater assembly of claim 1, wherein each of the one or more cavities has a concave shape in a cross-section perpendicular to a longitudinal axis of the spline.

10. The recoater assembly of claim 1, wherein the one or more cavities extend along a direction parallel to a longitudinal axis of the spline.

11. The recoater assembly of claim 1, wherein the one or more cavities are configured to carry powder material from inside the hopper body to outside the hopper body.

12. The recoater assembly of claim 1, wherein the hopper body has an exit opening in which the spline is positioned, the exit opening having a lower end and an upper end, and the spline is configured to rotate so that portions of the spline within the hopper body move upwardly and toward the upper end of the exit opening of the hopper body.

13. The recoater assembly of claim 1, wherein the spline is configured to carry powder material in the hopper body upwardly to and through an exit opening such that powder material is carried by the spline past a highest point of the spline.

14. The recoater assembly of claim 1, wherein the spline has an elongated shape with a longitudinal axis and is configured to rotate about the longitudinal axis of the spline.

15. The recoater assembly of claim 1, wherein the spline is configured to rotate to carry powder material upwardly and out of the hopper body.

16. A recoater assembly for depositing a powder material for an additive manufacturing system, the recoater assembly comprising:
a hopper body configured to hold powder material;
an auger configured to move powder material in the hopper body in two opposed directions in response to movement of the auger in a single direction;

a spline configured to dispense powder material from the hopper body in response to rotation of the spline relative to the hopper body; and a metering blade positioned over a portion of the spline and configured to define a gap between the metering blade and the spline to limit an amount of powder material that passes through the gap in response to rotation of the spline, wherein the metering blade has a surface that faces the spline and diverges away from the spline in a direction from a leading edge of the metering blade toward a trailing edge of the metering blade.

17. The recoater assembly of claim 16, wherein the auger has a longitudinal axis and the two opposed directions are along the longitudinal axis.

18. The recoater assembly of claim 17, wherein the auger is configured to move powder material in the two opposed directions in response to rotation of the auger about the longitudinal axis.

19. The recoater assembly of claim 16, wherein the auger comprises a double helix mixer configured to distribute the powder material in opposing directions along a longitudinal axis of the auger for a single direction of rotation of the auger.

20. The recoater assembly of claim 19, wherein a longitudinal axis of the auger is parallel to a horizontal axis.

21. The recoater assembly of claim 16, wherein the auger is configured to rotate about an axis that is parallel to an axis about which the spline is configured to rotate.

22. The recoater assembly of claim 16, wherein the auger includes first and second flights configured to move the powder material in the opposed directions in response to rotation of the auger.

23. The recoater assembly of claim 22, wherein the first and second flights are ribbon flights.

24. The recoater assembly of claim 22, wherein the first flight is configured to move the powder material in a first one of the two opposed directions and the second flight is configured to move the powder material in a second one of the two opposed directions.

25. The recoater assembly of claim 22, wherein the second flight is nested within the first flight.

26. The recoater assembly of claim 16, wherein the hopper body is elongated and has first and second ends, wherein the hopper body includes a powder inlet located at a first end of the hopper body, and wherein the auger is configured to move powder material from the first end of the hopper body toward the second end, and is configured to move powder material from the second end toward the first end.

27. The recoater assembly of claim 26, wherein the hopper body includes an exit opening through which powder material is dispensed from the hopper body, wherein the exit opening extends from the first end to the second end.

28. The recoater assembly of claim 16, further comprising a plate between the auger and hopper body at longitudinal ends of the auger, wherein a radius of each plate is greater than a radius of the auger.

29. A recoater assembly for depositing a powder material for an additive manufacturing system, the recoater assembly comprising:

a hopper body configured to hold a powder material;

an auger configured to move powder material in the hopper body;

a spline configured to dispense the powder material from the hopper body;

a drive system configured to move both the auger and the spline; and a metering blade positioned over a portion of the spline and configured to define a gap between the metering blade and the spline to limit an amount of powder material that passes through the gap in response to rotation of the spline, wherein the metering blade has a surface that faces the spline and diverges away from the spline in a direction from a leading edge of the metering blade toward a trailing edge of the metering blade.

30. The recoater assembly of claim 29, wherein the drive system is configured to rotate the auger in two rotational directions.

31. The recoater assembly of claim 29, wherein the drive system is configured to rotate the spline in only one rotational direction.

32. The recoater assembly of claim 29, wherein the drive system includes a single drive motor to move the auger and the spline.

33. The recoater assembly of claim 32, wherein the spline and the auger are both coupled to the single drive motor.

34. The recoater assembly of claim 33, wherein the auger and the spline are both directly coupled to the single drive motor.

35. The recoater assembly of claim 34, wherein the spline is coupled to the single drive motor by a one-way clutch.

36. The recoater assembly of claim 29, wherein the drive system is configured to simultaneously move both the auger and the spline.

37. The recoater assembly of claim 29, wherein the drive system is configured to move the auger in two rotational directions, and to move the spline in only one rotational direction.

38. The recoater assembly of claim 37, wherein the drive system includes a one-way clutch to drive the spline.

* * * * *